(12) United States Patent
Lau et al.

(10) Patent No.: US 11,767,140 B2
(45) Date of Patent: Sep. 26, 2023

(54) CONTAINER

(71) Applicant: FINEST PRODUCTS LIMITED, Hong Kong (CN)

(72) Inventors: Kwok Din Lau, Hong Kong (CN); Kwan Ming Jimmy Lau, Hong Kong (CN)

(73) Assignee: FINEST PRODUCTS LIMITED, Hong Kong (CN)

( * ) Notice: Subject to any disclaimer, the term of this patent is extended or adjusted under 35 U.S.C. 154(b) by 0 days.

(21) Appl. No.: 17/629,771

(22) PCT Filed: Jul. 23, 2020

(86) PCT No.: PCT/CN2020/103720
§ 371 (c)(1),
(2) Date: Jan. 24, 2022

(87) PCT Pub. No.: WO2021/013212
PCT Pub. Date: Jan. 28, 2021

(65) Prior Publication Data
US 2022/0267053 A1    Aug. 25, 2022

(30) Foreign Application Priority Data
Jul. 24, 2019   (CN) .......................... 201910672959.2

(51) Int. Cl.
*B65D 43/02*     (2006.01)
*B65D 1/26*      (2006.01)
(Continued)

(52) U.S. Cl.
CPC ........... *B65D 1/26* (2013.01); *B65D 21/0209* (2013.01); *B65D 43/0239* (2013.01);
(Continued)

(58) Field of Classification Search
CPC .. B65D 2543/0024; B65D 2543/00537; B65D 77/2088; B65D 77/2016;
(Continued)

(56) References Cited

U.S. PATENT DOCUMENTS 4,000,816 A    1/1977  Spruyt
2002/0170914 A1* 11/2002 Witt .................... B65D 43/0262
                                                   220/276
(Continued)

FOREIGN PATENT DOCUMENTS

CN           87211117 U        9/1988
CN           2240500 Y        11/1996
(Continued)

OTHER PUBLICATIONS

International Search Report for PCT/CN2020/103720 dated Oct. 28, 2020, ISA/CN.
(Continued)

*Primary Examiner* — King M Chu
(74) *Attorney, Agent, or Firm* — Yue (Robert) Xu; Apex Attorneys at Law, LLP (57) ABSTRACT

A container, comprising a container body and a container cover frame which are injection molded as a whole. The container body and the container cover frame are connected by means of breaking points; during sealing, the container body and the container cover frame are separated during the process of covering the container cover frame with a container cover film. The material cost is reduced, and the container can be used for multiple times; the provision of an anti-opening member on the container cover frame can prevent opening and avoid secondary sealing; by providing a sealing structure on the container body and the container cover frame, the container has a good sealing effect when reused for multiple times.

9 Claims, 6 Drawing Sheets

(51) Int. Cl.
  *B65D 77/20* (2006.01)
  *B65D 21/02* (2006.01)
(52) U.S. Cl.
  CPC ..... *B65D 43/0256* (2013.01); *B65D 77/2016* (2013.01); *B65D 2401/30* (2020.05)
(58) Field of Classification Search
  CPC ............ B65D 2401/30; B65D 43/0256; B65D 43/0239; B65D 21/0209
  USPC ........ 220/795, 782, 792, 796, 378, 802, 276
  See application file for complete search history.

(56) References Cited

U.S. PATENT DOCUMENTS

| | | |
|---|---|---|
| 2008/0041808 A1 | 2/2008 | Smith et al. |
| 2012/0199599 A1* | 8/2012 | Minnette ............ B65D 43/0212 220/780 |
| 2013/0146559 A1 | 1/2013 | Nilsson |
| 2013/0300028 A1 | 11/2013 | Naber |
| 2015/0203263 A1* | 7/2015 | Minnette ............ B65D 77/2032 220/270 |
| 2015/0353224 A1 | 12/2015 | Naber |
| 2016/0272378 A1 | 9/2016 | Chou |

FOREIGN PATENT DOCUMENTS

| | | |
|---|---|---|
| CN | 1946612 A | 4/2007 |
| CN | 202201299 U | 4/2012 |
| CN | 103079965 A | 5/2013 |
| CN | 103347797 A | 10/2013 |
| CN | 104936868 A | 9/2015 |
| CN | 105151545 A | 12/2015 |
| CN | 110271763 A | 9/2019 |
| CN | 210681701 U | 6/2020 |
| EP | 0324573 A1 | 7/1989 |
| EP | 0513888 A1 | 11/1992 |
| FR | 1378912 A | 11/1964 |
| GB | 2297081 A | 7/1996 |
| JP | 2014-502584 A | 2/2014 |
| JP | 2016-511707 A | 4/2016 |
| JP | 2018-131263 A | 8/2018 |

OTHER PUBLICATIONS

First Office Action dated Jan. 31, 2023 for Japanese patent application No. 2022-504684,English translation provided by Global Dossier.

* cited by examiner

CONTAINER

This application is a national phase application of PCT international patent application PCT/CN2020/103720, filed on Jul. 23, 2020 which claims the priority to Chinese Patent Application No. 201910672959.2, titled "CONTAINER", filed with the China National Intellectual Property Administration on Jul. 24, 2019, the entire disclosure of which is incorporated herein by reference.

FIELD

The present application relates to containers, and in particular to an environment-friendly food container which can be reused for times.

BACKGROUND

As the pace of modern society becomes more and more tense, fast food and product dispatch (such as Hema Xiansheng, Meituan, etc.) have become very important. An existing food container may be disposable or reusable. For a disposable food container, a cover film is covered on a container body, and the disposable food container cannot be sealed after use, which is not so often used and causes great environmental pollution. For a reusable food container, a container cover is made of plastic, and the manufacturing cost is high, the sealing performance thereof may be greatly reduced after opening, which is not conducive to the reuse of the product.

Chinese patent application CN201180062521.4 discloses a food container. This food container has an integral body made by injection molding for the purpose of manufacturing and packaging. The integral body includes a plastic tray with an open side and an annular plastic cover edge, the cover edge is located on the open side of the tray at a peripheral edge of the tray, and the cover edge surrounds the peripheral edge. The cover edge is connected to the tray via a relatively thin plastic film, and the cover edge is separated from the tray by forcing the cover edge and the tray to perform limited interactive movement. In addition, a cover foil is provided and is at least connected to the cover edge, and, the cover edge and the tray are in snap connection with each other after they are no longer the integral body.

Although the above scheme takes into account the production cost and realizes reuse; it still has several disadvantages. For example, the sealing performance of the food container decreases after repeated use; and some unscrupulous merchants may open the food container to replace the food, and reseal, which is difficult for the consumer to detect.

SUMMARY

In view of this, a container is provided according to the preset application, which can not only be reused for times while saving cost, but also can prevent opening and avoid secondary sealing, so as to solve the problems existing in the conventional technology.

A container is provided according to the preset application, which includes a container body, a container cover frame and a container cover film. The container body is connected to the container cover frame, and during sealing, the container body is separated from the container cover frame during a process of covering the container cover frame with the container cover film.

An anti-opening member is provided on the container cover frame, one end of the anti-opening member is a fixed end of the anti-opening member, and the fixed end of the anti-opening member is fixedly connected to the container cover frame; another end of the anti-opening member is an easy-to-break end of the anti-opening member, and the easy-to-break end of the anti-opening member is connected to the container body.

During first sealing, in the process of covering the container cover frame with the container cover film, the container body is separated from the container cover frame, the anti-opening member is deformed, and the easy-to-break end of the anti-opening member is kept connected to the container body.

Under a same tensile force, the easy-to-break end of the anti-opening member, as compared with the fixed end of the anti-opening member, is disconnected from the container body first.

Preferably, the container body is connected to the container cover frame by a breakpoint, and during the first sealing, a pressure, applied in the process of covering the container cover frame with the container cover film, disconnects the break point between the container body and the container cover frame, and the container body is separated from the container cover frame.

Preferably, the container body includes a container body side wall, a container body upper surface and a container body outer edge portion; the container cover frame includes a container cover frame outer edge portion, a container cover frame upper surface and a container cover frame inner edge portion; the container body outer edge portion is connected to the container cover frame inner edge portion by the breakpoint.

Preferably, the container cover frame upper surface is higher than the container body upper surface, and during the first sealing, the container body is separated from the container cover frame, and the container cover film covers the container cover frame upper surface and the container body upper surface.

Preferably, a sealing groove is defined on the container body outer edge portion, and a sealing protrusion is provided on the container cover frame inner edge portion, and during the first sealing, the container body is separated from the container cover frame, and the sealing protrusion fits the sealing groove.

Preferably, a cross section of the anti-opening member is U-shaped, and the anti-opening member is continuously or discontinuously distributed along the container cover frame.

Preferably, the sealing protrusion is continuously distributed along the container cover frame inner edge portion, and the sealing groove is continuously distributed along the container body outer edge portion.

Preferably, the easy-to-break end of the anti-opening member is connected to a lower end of the container body outer edge portion; and the fixed end of the anti-opening member is fixedly connected to the container cover frame outer edge portion.

Preferably, during first opening, the easy-to-break end of the anti-opening member is disconnected from the lower end of the container body outer edge portion, the fixed end of the anti-opening member is fixedly connected to the container cover frame outer edge portion, the container cover film is separated from the container body upper surface, and the container cover film is kept connected to the sealing cover; and the sealing protrusion is separated from the sealing groove.

Preferably, during re-sealing, the easy-to-break end of the anti-opening member is disconnected from the lower end of the container body outer edge portion, the fixed end of the anti-opening member is fixedly connected to the container cover frame outer edge portion, the container cover film is separated from the container body upper surface, and the container cover film is kept connected to the sealing cover; and the sealing protrusion fits the sealing groove.

In summary, as for the container according to the present application, an integral body made by injection molding is provided, the integral body includes the container body with an open side and the container cover frame, and the container body is connected to the container cover frame by the break point; the cost is saved, and the container can be reused for times; the anti-opening member is provided on the container cover frame, which can prevent opening and avoid secondary sealing; by provided sealing structures on the container body and the container cover frame, the container has a good sealing effect after repeated use.

BRIEF DESCRIPTION OF THE DRAWINGS

For more clearly illustrating embodiments of the present application or technical solutions in the conventional technology, the drawings referred to for describing the embodiments or the conventional technology will be briefly described hereinafter. Apparently, the drawings in the following description are only some examples of the present application, and for those skilled in the art, other drawings may be obtained based on the provided drawings without any creative efforts.

Reference numerals in the drawings are as follows:
10 container body,
11 container body side wall,
12 container body upper surface,
13 container body outer edge portion,
14 sealing groove,
15 easy-to-break end connecting point,
20 container cover frame,
21 container cover frame outer edge portion,
210 anti-opening member,
22 container cover frame upper surface,
23 container cover frame inner edge portion,
24 sealing protrusion,
25 easy-to-break end of the anti-opening member,
26 fixed end of the anti-opening member,
30 container cover film.

DETAILED DESCRIPTION OF THE EMBODIMENTS

A container is provided according to embodiments of the present application, so as to solve the problems existing in the conventional technology.

Hereinafter the technical solutions in the embodiments of the present application will be described clearly and completely. Obviously, the embodiments to be described are only a part of the embodiments of the present application, rather than all of them. All other examples obtained without creative work by those skilled in the art are within the protection scope of the present application.

In order to explain the present application in more detail, a container provided according to the present application will be described in detail with reference to the drawings.

Figure 1A:
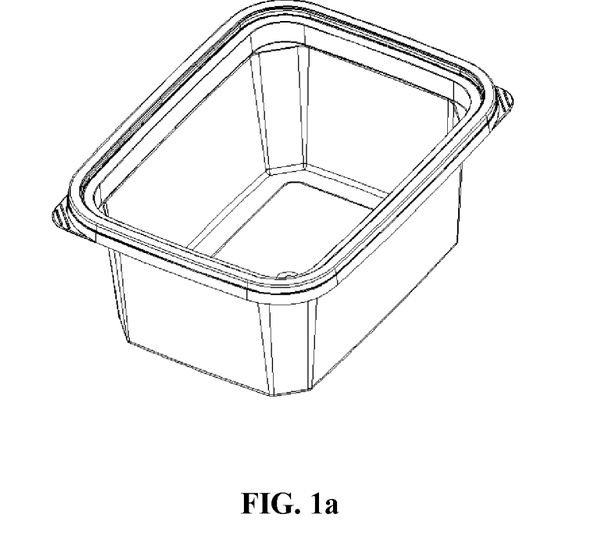
FIG. 1a is a schematic view of a single container body.
Figure 1B:
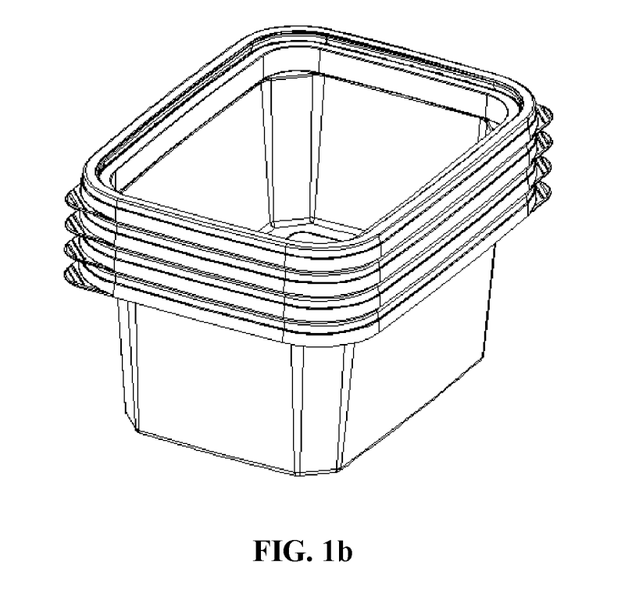
FIG. 1b is a schematic view of multiple container bodies.
Figure 1C:
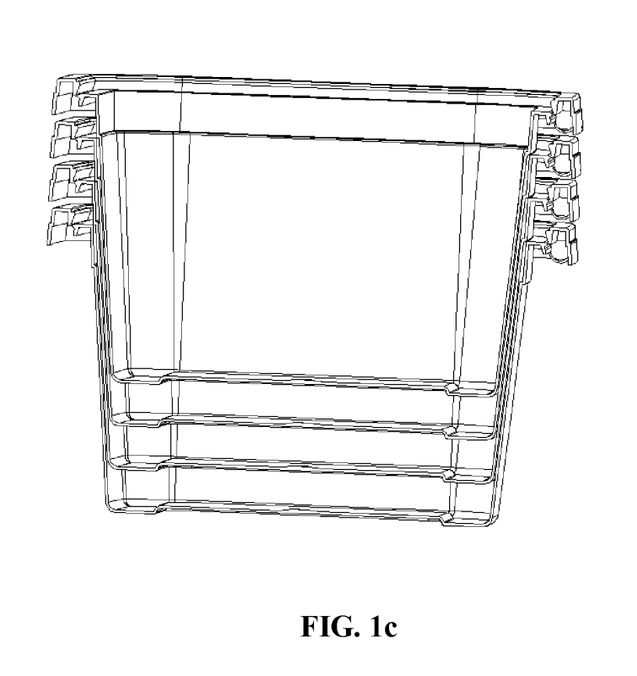
FIG. 1c is a cross-sectional view of the multiple container bodies.

As shown in FIG. 1, a container, considering the manufacturing process, includes a container body 10 and a container cover frame 20, which form an integral body by injection molding. The container body 10 is connected to the container cover frame 20 by a breakpoint. During sealing, the container body 10 is separated from the container cover frame 20 during a process of covering the container cover frame with a container cover film 30. Starting from the characteristics of the integral body of the container body 10 and the container cover frame 20 formed by injection molding, as shown in FIGS. 1b and 1c, multiple containers are stacked together, which saves space and is convenient for storage, movement and transportation.

Figure 2A:
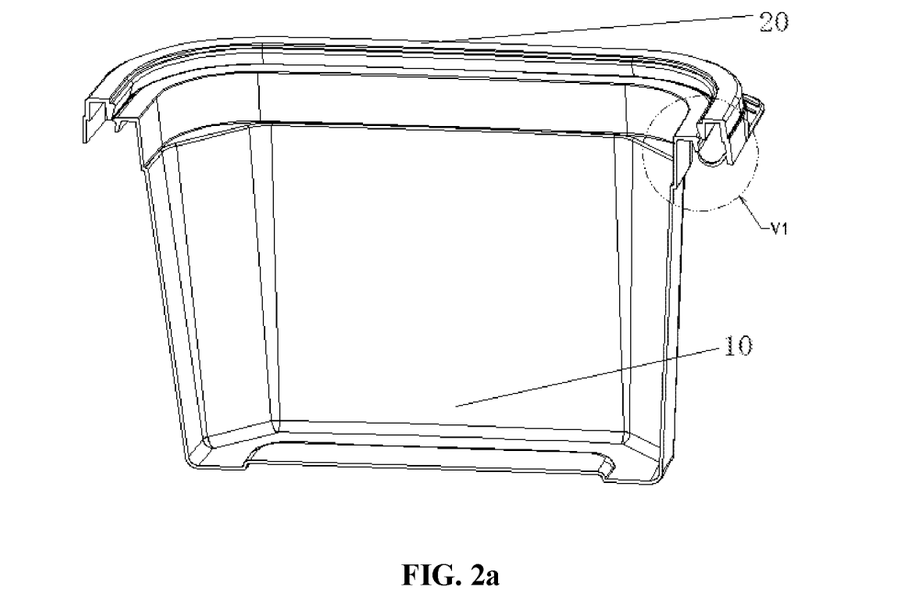
FIG. 2a is a cross-sectional view of the single container body.
Figure 2B:
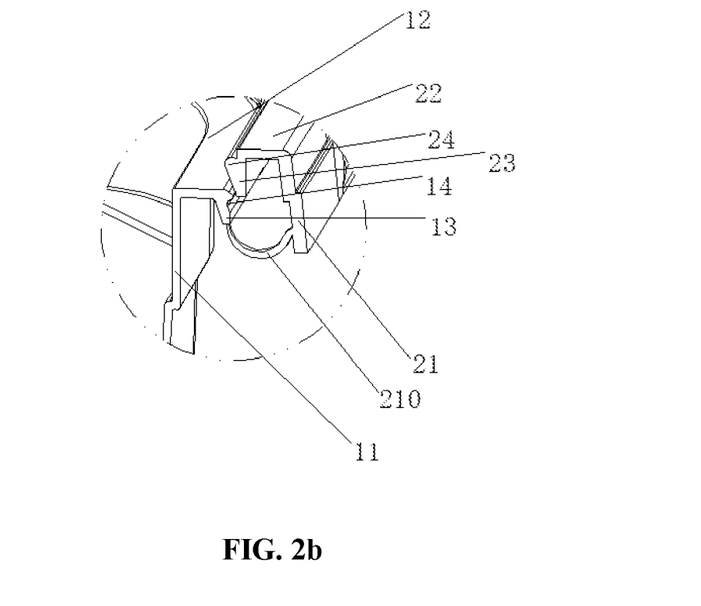
FIG. 2b is a partial enlarged view of the single container body.

As shown in FIG. 2, an anti-opening member 210 is provided on the container cover frame 20, one end of the anti-opening member 210 is a fixed end 26 of the anti-opening member, and the fixed end 26 of the anti-opening member is fixedly connected to the container cover frame 20; another end of the anti-opening member 210 is an easy-to-break end 25 of the anti-opening member, and the easy-to-break end 25 of the anti-opening member is connected to the container body 10.

During first sealing, the first sealing refers to a first use of the food container, for example, a food factory puts processed food into the container, and then seals it with the container cover film 30.

During the process of covering the container cover frame 20 with the container cover film 30, the container body 10 is separated from the container cover frame 20, and the anti-opening member 210 is deformed. From a comparison of FIGS. 2b and 3b, it can be seen that, although the anti-opening member 210 is deformed, the easy-to-break end 25 of the anti-opening member is kept connected to the container body 10.

Under a same tensile force, the easy-to-break end 25 of the anti-opening member, as compared with the fixed end 26 of the anti-opening member, is disconnected from the container body 10 first. The breakage of the anti-opening member 210 is permanent and irreparable.

The container body 10 and the container cover frame 20 are integrally formed by injection molding. Considering the manufacturing process, the container body 10 is connected to the container cover frame 20 by a breakpoint, and during the first sealing, a pressure, applied in the process of covering the container cover frame 20 with the container cover film 30, disconnects the break point between the container body 10 and the container cover frame 20, and the container body 10 is separated from the container cover frame 20.

As shown in FIG. 2b, the container body 10 includes a container body side wall 11, a container body upper surface 12 and a container body outer edge portion 13; the container cover frame 20 includes a container cover frame outer edge portion 21, a container cover frame upper surface 22 and a container cover frame inner edge portion 23; the container body outer edge portion 13 is connected to the container cover frame inner edge portion 23 by the breakpoint. The container cover frame upper surface 22 is higher than the container body upper surface 12, and during the first sealing, the container body 10 is separated from the container cover frame 20, and the container cover film 30 covers the container cover frame upper surface 22 and the container body upper surface 12. The container cover frame upper surface 22 and the container body upper surface 12 are located on a same height.

A sealing groove 14 is defined on the container body outer edge portion 13, and a sealing protrusion 24 is provided on the container cover frame inner edge portion 23, and during the first sealing, the container body 10 is separated from the container cover frame 20, and the sealing protrusion 24 fits the sealing groove 14.

As shown in FIG. 2b, a cross section of the anti-opening member 210 is U-shaped, and the anti-opening member 210 is continuously or discontinuously distributed along the container cover frame 20. One end of the anti-opening member 210 is the fixed end 26 of the anti-opening member, and the fixed end 26 of the anti-opening member is fixedly connected to the container cover frame 20; another end of the anti-opening member 210 is an easy-to-break end 25 of the anti-opening member, and the easy-to-break end 25 of the anti-opening member is connected to the container body 10. Specifically, the easy-to-break end 25 of the anti-opening member is connected to a lower end of the container body outer edge portion 13; and the fixed end 26 of the anti-opening member is fixedly connected to the container cover frame outer edge portion 21. During the process of covering the container cover frame 20 with the container cover film 30, the container body 10 is separated from the container cover frame 20, and the anti-opening member 210 is deformed, and the anti-opening member 210 with the U-shaped cross section is stretched into a diagonal line. From a comparison of FIGS. 2b and 3b, it can be seen that, although the anti-opening member 210 is deformed, the easy-to-break end 25 of the anti-opening member is kept connected to the container body 10. Under a same tensile force, the easy-to-break end 25 of the anti-opening member, as compared with the fixed end 26 of the anti-opening member, is disconnected from the container body 10 first. The breakage of the anti-opening member 210 is permanent and irreparable.

The sealing protrusion 24 is continuously distributed along the container cover frame inner edge portion 23, and the sealing groove 14 is continuously distributed along the container body outer edge portion 13.

The use process includes three processes of first sealing, first opening and re-sealing. During the first sealing, the first sealing refers to a first use of the food container, for example, a food factory puts processed food into the container, and then seals it with the container cover film 30. The first opening is defined with reference to the first sealing.

Figure 3A:
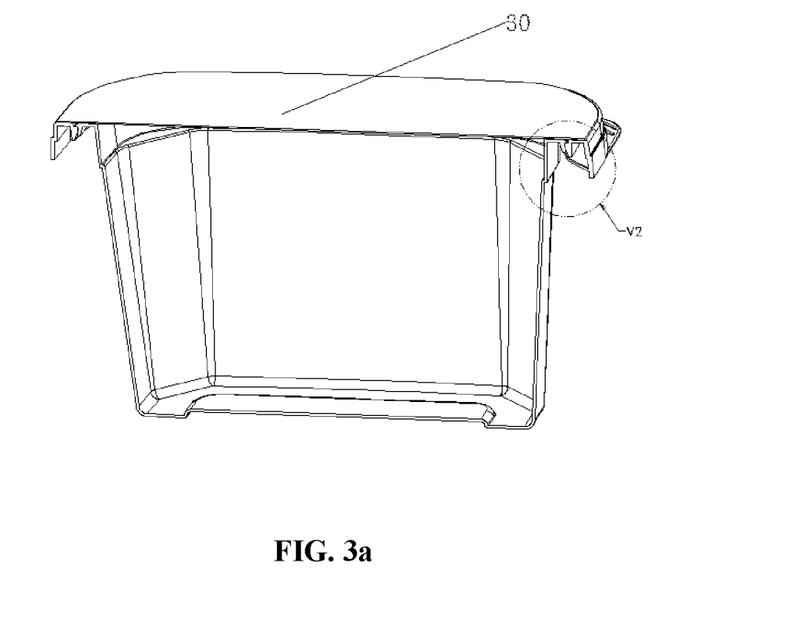
FIG. 3a is a cross-sectional view of the container with a cover film.
Figure 3B:
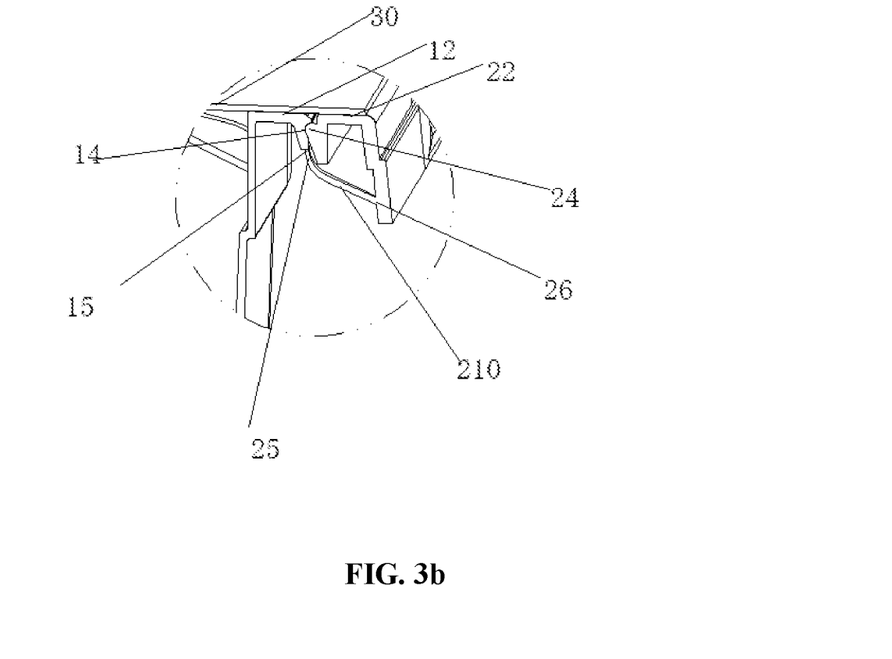
FIG. 3b is a partial enlarged view of the container with the cover film.

As shown in FIGS. 3a to 3b, the process of the first sealing is as follows: the food is put into the container body 10, and the container cover film 30 is covered on the container cover frame upper surface 22 and the container body upper surface 12, the pressure, applied during covering with the container cover film 30, disconnects the breakpoint between the container body 10 and the container cover frame 20, and the container body 10 is separated from the container cover frame 20; the container cover film 30 is covered on the container cover frame upper surface 22 and the container body upper surface 12, the sealing protrusion 24 is fitted into the sealing groove 14, the anti-opening member 210 is deformed, and the anti-opening member 210 with the U-shaped cross section is stretched into the diagonal line. Although the anti-opening member 210 is deformed, the easy-to-break end 25 of the anti-opening member is kept connected to the lower end of the container body outer edge portion 13.

Figure 4A:
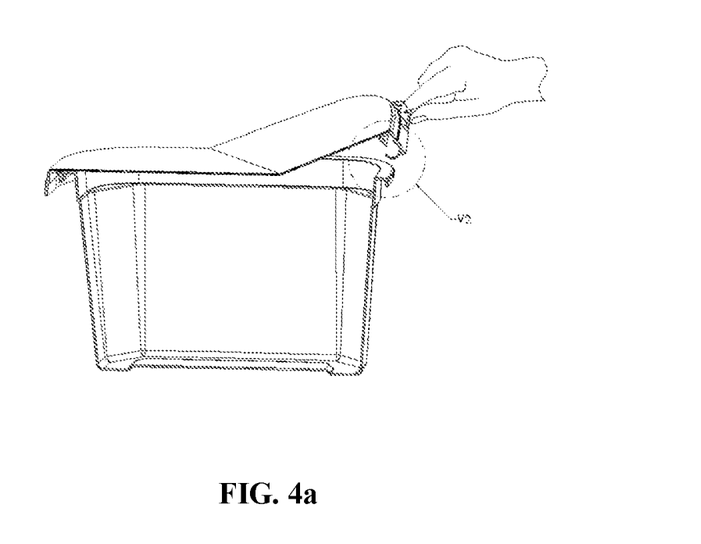
FIG. 4a is a schematic view of opening a container cover.
Figure 4B:
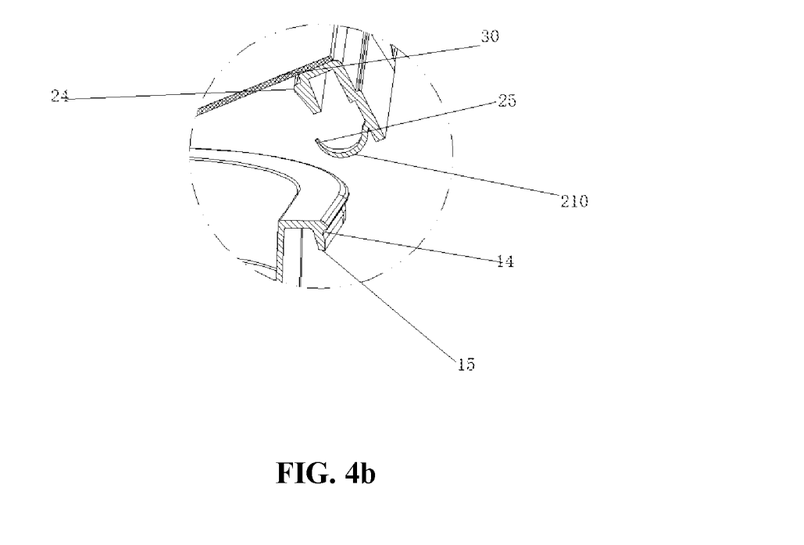
FIG. 4b is a partial enlarged view of opening the container cover.

As shown in FIGS. 4a to 4b, the process of the first opening is as follows: under a same tensile force, the easy-to-break end 25 of the anti-opening member, as compared with the fixed end 26 of the anti-opening member, is disconnected from the container body 10 first; during the process of opening, the hand exerts an upward pulling force, the easy-to-break end 25 of the anti-opening member is disconnected from the lower end of the container body outer edge portion 13, that is, an easy-to-break end connecting point 15; the fixed end 26 of the anti-opening member is fixedly connected to the container cover frame outer edge portion 21, and the anti-opening member 210 stretched into the diagonal line is reset to the U-shaped cross section, wherein the breakage of the anti-opening member 210 is permanent and irreparable; the container cover film 30 is separated from the container body upper surface 12, and the container cover film 30 remains covering the container cover frame upper surface 22, forming an integral container cover; and the sealing protrusion 24 is separated from the sealing groove 14.

Figure 5A:
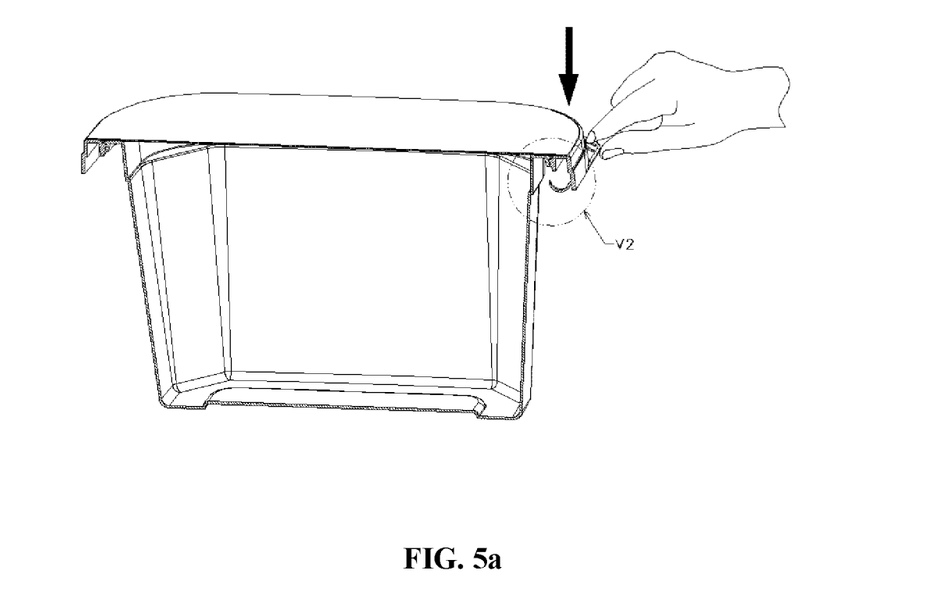
FIG. 5a is schematic view of closing the container cover.
Figure 5B:
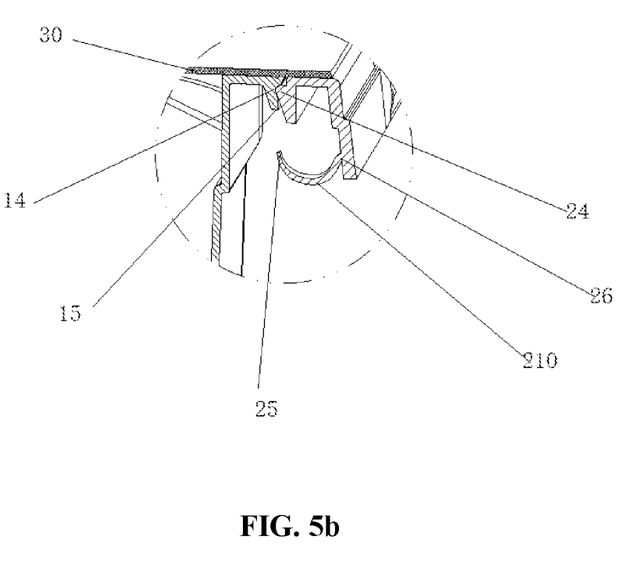
FIG. 5b is a partial enlarged view of closing the container cover.

As shown in FIGS. 5a to 5b, the process of the re-sealing is as follows: the hand exerts a downward pressure, and the container cover film 30 as the integral container cover remains covering the container cover frame upper surface 22; the sealing protrusion 24 is fitted into the sealing groove 14; wherein the breakage of the anti-opening member 210 shown is permanent and irreparable; the easy-to-break end 25 of the anti-opening member is disconnected from the container body 10, the fixed end 26 of the anti-opening member is fixedly connected to the container cover frame outer edge portion 21, and the anti-opening member 210 stretched into the diagonal line is reset to the U-shaped cross section; the container cover film 30 is not connected to the container body upper surface 12.

In summary, as for the container according to the present application, an integral body made by injection molding is provided, the integral body includes the container body 10 with an open side and the container cover frame 20, and the container body 10 is connected to the container cover frame 20 by the break point; the cost is saved, and the container can be reused for times; the anti-opening member 210 is provided on the container cover frame 20, which can prevent opening and avoid secondary sealing; by provided sealing structures on the container body 10 and the container cover frame 20, the container has a good sealing effect after repeated use.

The above-mentioned is only preferable embodiments of the present application. It should be noted that those skilled in the art can make improvements and modifications without departing from the principle of the present application. These improvements and modifications should also fall within the protection scope of the present application.

The invention claimed is:

1. A container, comprising a container body, a container cover frame and a container cover film, wherein the container body is connected to the container cover frame;

an anti-opening member is provided on the container cover frame, one end of the anti-opening member is a fixed end of the anti-opening member, and the fixed end of the anti-opening member is fixedly connected to the container cover frame; another end of the anti-opening member is an easy-to-break end of the anti-opening member, and the easy-to-break end of the anti-opening member is connected to the container body;

the anti-opening member is configured to be deformed during first sealing, and the easy-to-break end of the anti-opening member is configured to be broken from the container body during first opening; and the container body is connected to the container cover frame by a breakpoint.

2. The container according to claim 1, wherein the container body comprises a container body side wall, a container body upper surface and a container body outer edge portion; the container cover frame comprises a container cover frame outer edge portion, a container cover frame upper surface and a container cover frame inner edge portion; the container body outer edge portion is connected to the container cover frame inner edge portion by the breakpoint.

3. The container according to claim 2, wherein the container cover frame upper surface is higher than the container body upper surface, and during the first sealing, the container body is separated from the container cover frame, and the container cover film covers the container cover frame upper surface and the container body upper surface.

4. The container according to claim 3, wherein a sealing groove is defined on the container body outer edge portion, and a sealing protrusion is provided on the container cover frame inner edge portion, and during the first sealing, the container body is separated from the container cover frame, and the sealing protrusion fits the sealing groove.

5. The container according to claim 4, wherein a cross section of the anti-opening member is U-shaped, and the anti-opening member is continuously or discontinuously distributed along the container cover frame.

6. The container according to claim 5, wherein the sealing protrusion is continuously distributed along the container cover frame inner edge portion, and the sealing groove is continuously distributed along the container body outer edge portion.

7. The container according to claim 6, wherein the easy-to-break end of the anti-opening member is connected to a lower end of the container body outer edge portion; and the fixed end of the anti-opening member is fixedly connected to the container cover frame outer edge portion.

8. The container according to claim 7, wherein during the first opening, the easy-to-break end of the anti-opening member is disconnected from the lower end of the container body outer edge portion, the fixed end of the anti-opening member is fixedly connected to the container cover frame outer edge portion, the container cover film is separated from the container body upper surface, and the container cover film is kept connected to the sealing cover; and the sealing protrusion is separated from the sealing groove.

9. The container according to claim 8, wherein during re-sealing, the easy-to-break end of the anti-opening member is disconnected from the lower end of the container body outer edge portion, the fixed end of the anti-opening member is fixedly connected to the container cover frame outer edge portion, the container cover film is separated from the container body upper surface, and the container cover film is kept connected to the sealing cover; and the sealing protrusion fits the sealing groove.

* * * * *